US010844777B2

(12) United States Patent
Gill et al.

(10) Patent No.: US 10,844,777 B2
(45) Date of Patent: Nov. 24, 2020

(54) ECBV MODULE

(71) Applicant: Continental Powertrain USA, LLC, Auburn Hills, MI (US)

(72) Inventors: Ravinder Singh Gill, Chatham (CA); Brian Gordon Woods, Chatham (CA); Benjamin Dominick Manton Williams, Chatham (CA); Jaime Altes Sosa, Chatham (CA); David Rene Forgeron, Chatham (CA); Daniel Clayton Todd Jackson, Chatham (CA)

(73) Assignee: Continental Powertrain USA, LLC, Auburn Hills, MI (US)

( * ) Notice: Subject to any disclaimer, the term of this patent is extended or adjusted under 35 U.S.C. 154(b) by 0 days.

(21) Appl. No.: 16/362,809

(22) Filed: Mar. 25, 2019

(65) Prior Publication Data

US 2020/0309022 A1    Oct. 1, 2020

(51) Int. Cl.
*F02B 37/18* (2006.01)
*F02B 37/00* (2006.01)
*F02D 41/00* (2006.01)

(52) U.S. Cl.
CPC .......... *F02B 37/183* (2013.01); *F02B 37/002* (2013.01); *F02D 41/0007* (2013.01); *F02D 2200/0406* (2013.01)

(58) Field of Classification Search
CPC ...... F02B 37/002; F02B 37/16; F02B 37/168; F02B 37/162; F02B 37/164; F02B 37/183; F02B 33/44; F02D 41/003; F02D 41/0032; F02D 41/004; F02D 41/007; F02D 2200/0406; F02M 13/00; F02M 21/04; F02M 21/047; F02M 25/06; F02M 25/08; F02M 25/0836; F02M 2025/0845; F02M 25/0872; F02M 25/089; F02M 35/10; F02M 35/10157; F02M 35/10163; F02M 35/10118; F02M 35/10229
See application file for complete search history.

(56) References Cited

U.S. PATENT DOCUMENTS

| 2013/0233276 | A1* | 9/2013 | Pursifull | F02D 9/02 123/337 |
| 2014/0116399 | A1* | 5/2014 | Ulrey | F02M 25/08 123/520 |

* cited by examiner

*Primary Examiner* — Jesse S Bogue
*Assistant Examiner* — Loren C Edwards

(57) ABSTRACT

An electronic compressor bypass valve (eCBV) module includes a pedestal housing, and a compressor bypass valve mounted to the pedestal housing. An inlet port, a first outlet port, and a second outlet port are integrally formed as part of the pedestal housing, where pressurized air flows into the inlet port. The eCBV module also includes a venturi device at least partially disposed in the second outlet port. When the compressor bypass valve is in an open position, a portion of the pressurized air flows through the first outlet port, and a portion of the pressurized air flows from the inlet port through the venturi device and through the second outlet port. When the compressor bypass valve is in the closed position the pressurized air is prevented from flowing into the first outlet port, and all of the pressurized air flows through the venturi device and through the second outlet port.

13 Claims, 2 Drawing Sheets

ECBV MODULE

FIELD OF THE INVENTION

The invention relates generally to a vapor purge system which integrates an electronic compressor bypass valve (eCBV) and a venturi module into a single unit.

BACKGROUND OF THE INVENTION

Turbochargers are commonly used to increase the power of a vehicle engine. Turbochargers include a turbine which generates pressurized air, and the pressurized air is forced into the engine to increase combustion pressure, and therefore increase the power generated by the engine.

With some tubocharging systems, a portion of the pressurized air is recirculated to create a vacuum and induce flow of purge vapor. The vacuum created is used as part of a purge system, where the purge system directs purge vapors from a fuel tank through various conduits to redirect the vapors into the intake manifold of the engine, and burn off these vapors through combustion.

Many current turbo purge systems use a venturi vacuum generator (such as a vacuum pump) to allow purge of the evaporative system while the turbocharger is activated (i.e., the intake manifold is under positive pressure). This involves the addition of various components to the vapor purge system. The amount of pressurized air directed to the venturi vacuum generator is controlled by some type of valve assembly.

Also, typical turbo purge systems also require the ability to detect when there is a disconnect of the conduit or hose connected to the outlet of the venturi vacuum generator and the air box upstream of the turbocharger. If this hose becomes disconnected, the venturi vacuum generator releases purge vapor into the environment.

Accordingly, there exists a need for a turbo purge system which has a simplified design with less components, and reduces or eliminates the possibility of a hose-off condition, preventing purge vapor from being released into the atmosphere.

SUMMARY OF THE INVENTION

The present invention is an electronic compressor bypass valve (eCBV) module which reduces the number of components required to generate vacuum while the intake manifold of an engine is operating under positive pressure. More specifically, the eCBV module eliminates the need for venturi inlet and outlet hoses, and integrates the flow paths typically provided by these components into the housing of the eCBV module, and the outlet conduit is commonized with the recirculation loop for the eCBV module. Additionally, by eliminating these components, the eCBV module eliminates the need for a separate venturi hose-off detection system.

In one embodiment, the present invention is an eCBV module which includes a pedestal housing, a compressor bypass valve mounted to the pedestal housing, and an inlet port integrally formed as part of the pedestal housing, where pressurized air flows into the inlet port. A first outlet port is integrally formed as part of the pedestal housing. When the compressor bypass valve is in an open position, a portion of the pressurized air flows through the first outlet port, and when the compressor bypass valve is in the closed position the pressurized air is prevented from flowing into the first outlet port.

The eCBV module also includes a second outlet port integrally formed as part of the pedestal housing, and the second outlet port is in fluid communication with the inlet port. The eCBV module also includes a venturi device at least partially disposed in the second outlet port. A portion of the pressurized air flows from the inlet port through the venturi device and through the second outlet port when the compressor bypass valve is in the open position, and when the compressor bypass valve is in the closed position, all of the pressurized air flows through the venturi device and through the second outlet port.

In an embodiment, the eCBV module includes an aperture integrally formed as part of the second outlet port at a location downstream from the venturi device, and a conduit connected to the second outlet port such that the conduit is connected to the aperture. The purge vapor enters the second outlet port through the aperture, and pressurized air passing through the venturi device creates vacuum pressure in the conduit, drawing purge vapor from the conduit into the second outlet port.

In an embodiment, the compressor bypass valve includes a valve member selectively in contact with a valve seat formed as part of the inlet port. When the valve member is moved away from the valve seat, a portion of the pressurized air flowing into the inlet port flows into the first outlet port, and a portion of the pressurized air flowing into the inlet port also flows into the venturi device and through the second outlet port. All of the pressurized air flowing into the inlet port flows through the venturi device and through the second outlet port when the valve member is in contact with the valve seat.

In an embodiment, the venturi device is integrally formed with the pedestal housing such that the pressurized air flowing through the inlet port enters the venturi device at a location upstream of the second outlet port.

In an embodiment, the electronic compressor bypass module is part of a vapor purge system for a vehicle. The vapor purge system includes a turbocharger in fluid communication with the inlet port, the first outlet port, and the second outlet port. The inlet port receives pressurized air from the turbocharger, and pressurized air flows from the first outlet port and the second outlet port to the turbocharger when the compressor bypass valve is in the open position, and a mixture of pressurized air and purge vapor flows from the second outlet port to the turbocharger unit when the compressor bypass valve is in the closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
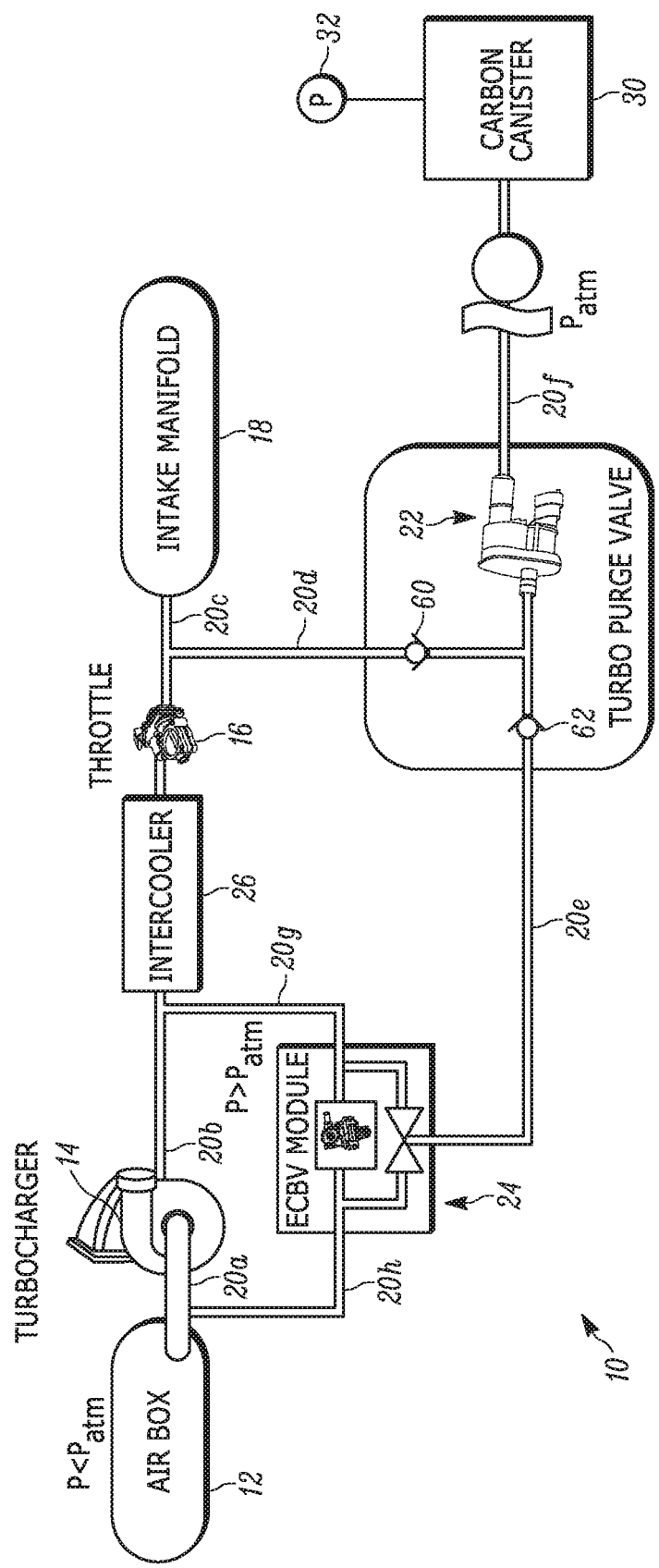
FIG. 1 is a diagram of a vapor purge system for a vehicle having an electronic compressor bypass valve module, according to embodiments of the present invention.

A diagram of an airflow system of a vehicle having an electronic compressor bypass valve (eCBV) module according to the present invention is shown generally in FIG. 1 at 10. The system 10 includes an air box 12 which intakes air from the atmosphere. Located downstream of and in fluid communication with the air box 12 is a turbocharger unit 14, and located downstream of and in fluid communication with the turbocharger unit 14 is a throttle assembly 16. Disposed between and in fluid communication with the turbocharger unit 14 and the throttle assembly 16 is an intercooler 26. The throttle assembly 16 controls the amount of air flow into an intake manifold 18, which is part of an engine.

A plurality of conduits also provides fluid communication between the various components. Air flows through the conduits between the various components, and the direction of airflow through the conduits varies, depending on the mode of operation of each component. More specifically, there is a first conduit 20a providing fluid communication between the air box 12 and the turbocharger unit 14, a second conduit 20b providing fluid communication between the turbocharger unit 14 and the throttle assembly 16, where the intercooler 26 is disposed in the second conduit 20b. There is also a third conduit 20c providing fluid communication between the throttle assembly 16 and the intake manifold 18.

A fourth conduit 20d is in fluid communication with the third conduit 20c and a turbo purge valve assembly, shown generally at 22, and a fifth conduit 20e places the turbo purge valve assembly 22 in fluid communication with an eCBV module, shown generally at 24. The turbo purge valve assembly 22 includes a first check valve 60 in fluid communication with the fourth conduit 20d, and a second check valve 62 in fluid communication with the fifth conduit 20e. There is also a carbon canister 30 in fluid communication with the turbo purge valve assembly 22 through the use of a sixth conduit 20f. When the turbocharger unit 14 is generating pressurized air, and purge vapor is passing through the purge valve assembly 22, some level of vacuum is detectable in the canister 30 by a pressure sensor 32.

A seventh conduit 20g provides fluid communication between the eCBV module 24 and the second conduit 20b, such that pressurized air is able to flow from the second conduit 20b, through the seventh conduit 20g and to the eCBV module 24. An eighth conduit 20h provides fluid communication between the eCBV module 24 and the first conduit 20a.

Figure 2:
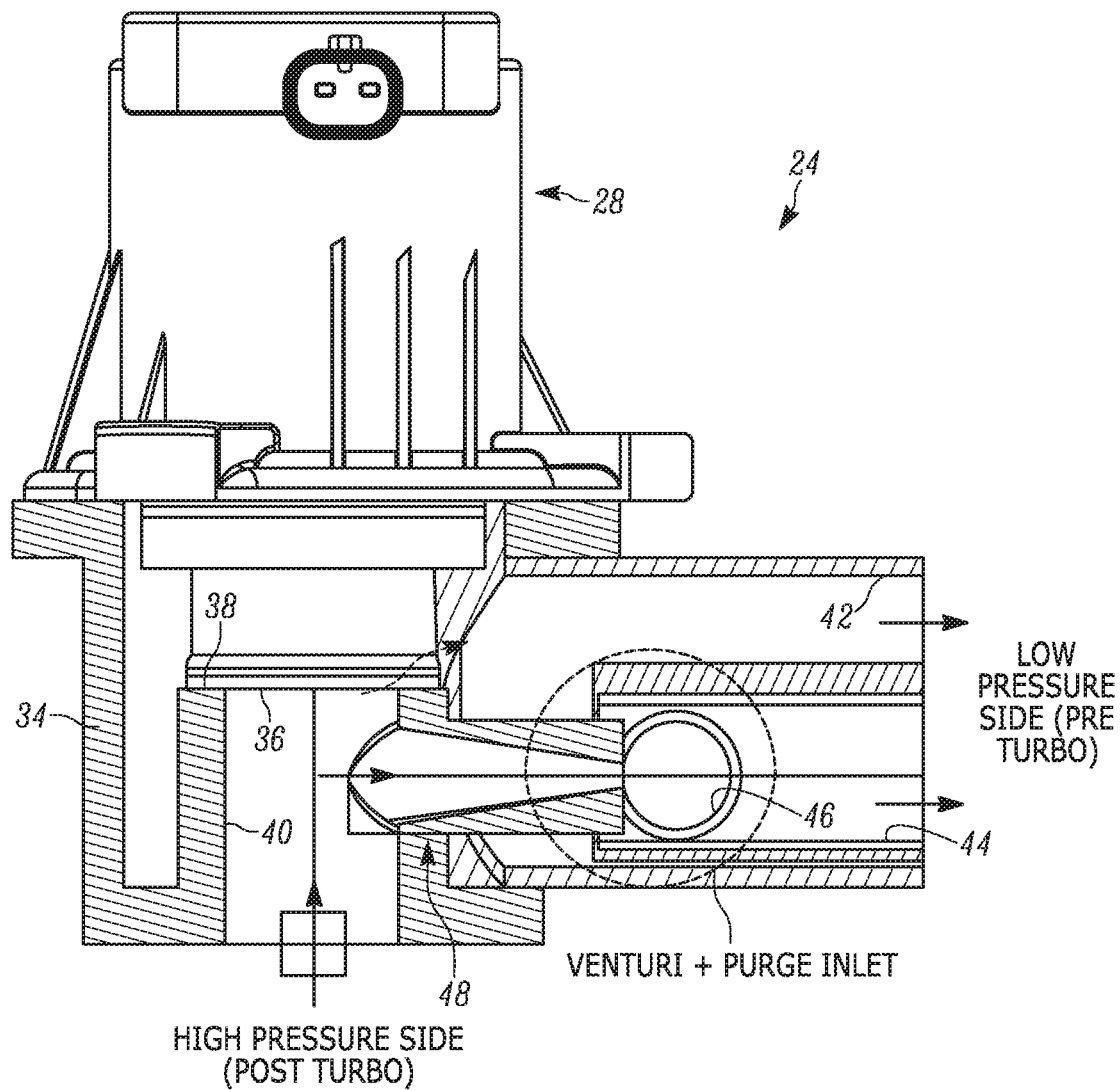
FIG. 2 is a sectional view of an electronic compressor bypass valve module, according to embodiments of the present invention.

Referring to FIG. 2, the eCBV module 24 includes a compressor bypass valve, shown generally at 28, connected to a pedestal housing 34. The compressor bypass valve 28 includes a valve member 36 which is selectively in contact with a valve seat 38 formed as part of the pedestal housing 34. The valve seat 38 is integrally formed as part of an inlet port 40, and the inlet port 40 is connected to and in fluid communication with the seventh conduit 20g. Also formed as part of the pedestal housing 34 is a first outlet port 42 and a second outlet port 44. Formed as part of the second outlet port 44 is an aperture 46 which functions as another inlet port. The aperture 46 is connected to and in fluid communication with the fifth conduit 20e. Integrally formed with the pedestal housing 34 is a venturi device, shown generally at 48. While is it shown that the venturi device 48 is integrally formed with the pedestal housing 34, it is within the scope of the invention that the venturi device 48 may be a separate component from the pedestal housing 34. The venturi device 48 is in fluid communication with the inlet port 40 and the second outlet port 44, and is also in fluid communication with the aperture 46 and therefore the fifth conduit 20e.

The compressor bypass valve 28 is a two-position valve, where the valve member 36 is able to be changed between an open position and a closed position. The first outlet port 42 is selectively in fluid communication with the inlet port 40, depending on whether the valve member 36 is in contact with the valve seat 38. When the valve member 36 is not in contact with the valve seat 38, the compressor bypass valve 28 is in an open position, and the inlet port 40 is in fluid communication with both the first outlet port 42 and the second outlet port 44. When the valve member 36 is in contact with the valve seat 38, as shown in FIG. 2, the compressor bypass valve 28 is in the closed position, such that there is no fluid communication between the inlet port 40 and the first outlet port 42, and all of the pressurized air generated by the turbocharger unit 14 flows through the venturi device 48 and the second outlet port 44.

The air flow system 10 has multiple modes of operation. In a first mode of operation, when the turbocharger unit 14 is not active, air flows through the air box 12, the turbocharger unit 14, the intercooler 26, the throttle 16, and into the intake manifold 18. There is vacuum pressure in the intake manifold 18 created by the engine during the first mode of operation, drawing air into the intake manifold 18. The fourth conduit 20d is also exposed to the vacuum pressure created by the engine, such that there is also vacuum pressure in the fourth conduit 20d, and when turbo purge valve 22 is in the open position, the vacuum pressure causes the first check valve 60 to open, allowing purge vapor to pass from canister 30, through the sixth conduit 20f, through the turbo purge valve 22, and into the fourth conduit 20d. The purge vapor from flows through the fourth conduit 20d, through the third conduit 20c where the purge vapor mixes with air and flows into the intake manifold 18. This same vacuum pressure also causes the second check valve 62 to close, such that the purge vapor does not pass through the second check valve 62.

The air flow system 10 also has a second mode of operation, where the turbocharger unit 14 is activated, and air flowing into the turbocharger unit 14 from the air box 12 is pressurized. During the second mode of operation, the throttle 16 is in a partially open position, and the throttle 16 controls the flow of pressurized air into the intake manifold 18. More specifically, the throttle 16 is placed in various positions (most of which are some configuration of the throttle 16 being partially open) to vary the flow of air into the intake manifold 18, depending upon the load demand of the engine. Therefore, there is a limited number of operating conditions where all the pressurized air generated by the turbocharger 14 flows through the throttle 16, such that most of the time, a portion of the pressurized air exiting the turbocharger unit 14 flows into the seventh conduit 20g, and into inlet port 40 of the eCBV module 24.

During the second mode of operation, the compressor bypass valve 28 is in the closed position, and the portion of the pressurized air flowing into the inlet port 40 from the seventh conduit 20g is directed to and flows through the venturi device 48, through the second outlet port 44, and into the eighth conduit 20h. The pressurized air flows into the venturi device 48 at a location that is upstream of the second outlet port 44. The pressurized air flowing through venturi device 48 also creates vacuum pressure in the fifth conduit 20e, where air is drawn from the fifth conduit 20e into eCBV module 24. More specifically, air is drawn from the fifth conduit 20e through the aperture 46 and into the second outlet port 44, such that the air passes through the eighth conduit 20h and into the first conduit 20a. During the second mode of operation, this vacuum pressure in the fifth conduit 20e also places the second check valve 62 in an open position. During the second mode of operation, purge vapor from the canister 30 passes through the sixth conduit 20f, through the turbo purge valve 22, and into the fifth conduit 20e. The purge vapor flows into the eCBV module 24 and mixes with the pressurized air in the eighth conduit 20h, and flows into the first conduit 20a. The purge vapor and air mixture then flows through the turbocharger unit 14, the throttle 16, and into the intake manifold 18. In the second mode of operation, the manifold 18 is operating under positive pressure. Some of this pressurized air flows from the third conduit into the fourth conduit 20d, preventing the first check valve 60 from changing to an open position.

The air flow system 10 also includes a third mode of operation, where again the turbocharger unit 14 is activated, and air flowing into the turbocharger unit 14 from the air box 12 is pressurized. In the third mode of operation, the throttle 16 is in a closed position, and all of the pressurized air passes through the seventh conduit 20g, and into the eCBV module 24. During the third mode of operation, the compressor bypass valve 28 is in the open position, such that a portion of the pressurized air flowing into the eCBV module 24 flows through the first outlet port 42, and a portion of the pressurized air flowing into the eCBV module 24 flows through the venturi device 48 and the second outlet port 44. The ratio of pressurized air flowing through the first outlet port 42 and the second outlet port 44 depends on the geometrical characteristics of the venturi device 48, and the size of the first outlet port 42 and the second outlet port 44. The ratio of pressurized air flowing through the first outlet port 42 and the second outlet port 44 is also dependent upon the location of the valve member 36 when the valve member 36 is in the open position (i.e., the compressor bypass valve 28 may be such that the valve member 36 has a longer range of travel, such that when the valve member 36 is in the open position, larger amounts of pressurized air is able to flow from the inlet port 40 to the outlet ports 42,44).

The eCBV module 24 of the present invention also eliminates the need for a separate hose-off detection system used to detecting when the eighth conduit 20h has become disconnected. Rather, the detection of whether the eighth conduit 20h has become disconnected is achieved during an air induction system leakage check.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
an electronic compressor bypass valve module, comprising:
a pedestal housing;
a compressor bypass valve mounted to the pedestal housing;
a single valve member being part of the compressor bypass valve, the compressor bypass valve able to place the single valve member in an open position or a closed position;
an inlet port integrally formed as part of the pedestal housing;
a plurality of outlet ports integrally formed as part of the pedestal housing;
a venturi device integrally formed as part of the pedestal housing;
wherein pressurized air flows into the inlet port and when the single valve member of the compressor bypass valve is in the open position, the pressurized air flows through each of the plurality of outlet ports, and when the single valve member of the compressor bypass valve is in the closed position, the pressurized air flows through the venturi device and through one of the plurality of outlet ports, and the pressurized air is prevented from flowing into another of the plurality of outlet ports.

2. The apparatus of claim 1, the plurality of outlet ports further comprising:
a first outlet port integrally formed as part of the pedestal housing, the compressor bypass valve operable for placing the inlet port selectively in fluid communication with the first outlet port;
a second outlet port integrally formed as part of the pedestal housing, the second outlet port in fluid communication with the inlet port;
wherein the venturi device is integrally formed with the pedestal housing such that the pressurized air flowing through the inlet port enters the venturi device at a location upstream of the second outlet port.

3. The apparatus of claim 2, further comprising:
an aperture integrally formed as part of the second outlet port at a location downstream from the venturi device;
wherein purge vapor enters the second outlet port through the aperture.

4. The apparatus of claim 3, further comprising:
a conduit connected to the second outlet port such that the conduit is connected to the aperture;
wherein the pressurized air passing through the venturi device creates vacuum pressure in the conduit, drawing purge vapor from the conduit into the second outlet port.

5. The apparatus of claim 2, further comprising:
wherein a portion of the pressurized air flowing into the inlet port flows into the first outlet port and another portion of the pressurized air flowing into the inlet port flows through the venturi device and into the second outlet port when the single valve member is in the open position, and all of the pressurized air flowing into the inlet port flows through the venturi device and through the second outlet port when the single valve member is in the closed position.

6. The apparatus of claim 1, wherein the electronic compressor bypass valve module is part of a vapor purge system for a vehicle.

7. The apparatus of claim 6, further comprising:
a turbocharger unit in fluid communication with the inlet port, the first outlet port, and the second outlet port;
wherein the inlet port receives the pressurized air from the turbocharger unit, and pressurized air flows from the first outlet port and the second outlet port to the turbocharger unit when the compressor bypass valve is in the open position, and a mixture of pressurized air and purge vapor flows from the second outlet port to the turbocharger unit when the compressor bypass valve is in the closed position.

8. An electronic compressor bypass valve module, comprising:

a pedestal housing;

a compressor bypass valve mounted to the pedestal housing;

an inlet port integrally formed as part of the pedestal housing, and pressurized air flows into the inlet port;

a single valve member being part of the compressor bypass valve, the single valve member selectively in contact with a valve seat formed as part of the inlet port;

a first outlet port integrally formed as part of the pedestal housing, when the single valve member of the compressor bypass valve is in an open position a portion of the pressurized air flows through the first outlet port, and when the single valve member of the compressor bypass valve is in a closed position the pressurized air is prevented from flowing into the first outlet port;

a second outlet port integrally formed as part of the pedestal housing, the second outlet port in fluid communication with the inlet port; and a venturi device at least partially disposed in the second outlet port;

wherein a portion of the pressurized air flows from the inlet port through the venturi device and through the second outlet port when the single valve member of the compressor bypass valve is in the open position, and when the single valve member of the compressor bypass valve is in the closed position, all of the pressurized air flows through the venturi device and through the second outlet port.

9. The electronic compressor bypass valve module of claim 8, further comprising:

an aperture integrally formed as part of the second outlet port at a location downstream from the venturi device; and a conduit connected to the second outlet port such that the conduit is connected to the aperture;

wherein purge vapor enters the second outlet port through the aperture, and pressurized air passing through the venturi device creates vacuum pressure in the conduit, drawing purge vapor from the conduit into the second outlet port.

10. The electronic compressor bypass valve module of claim 8, wherein all of the pressurized air flowing into the inlet port flows through the venturi device and through the second outlet port when the single valve member is in contact with the valve seat, and when the single valve member is moved away from the valve seat, a portion of the pressurized air flowing into the inlet port flows into the first outlet port and another portion of the pressurized air flowing into the inlet port flows into the venturi device and through the second outlet port.

11. The electronic compressor bypass valve module of claim 8, wherein the venturi device is integrally formed with the pedestal housing such that the pressurized air flowing through the inlet port enters the venturi device at a location upstream of the second outlet port.

12. The electronic compressor bypass valve module of claim 8, wherein the electronic compressor bypass valve module is part of a vapor purge system for a vehicle.

13. The electronic compressor bypass valve module of claim 12, further comprising:

a turbocharger unit in fluid communication with the inlet port, the first outlet port, and the second outlet port;

wherein the inlet port receives the pressurized air from the turbocharger unit, and the pressurized air flows from the first outlet port and the second outlet port to the turbocharger unit when the compressor bypass valve is in the open position, and a mixture of the pressurized air and purge vapor flows from the second outlet port to the turbocharger unit when the compressor bypass valve is in the closed position.

* * * * *